United States Patent
Wagoner et al.

(10) Patent No.: US 10,103,665 B2
(45) Date of Patent: Oct. 16, 2018

(54) PROTECTION FOR REDUNDANCY OF ISOLATED INVERTER BLOCKS

(71) Applicant: General Electric Company, Schenectady, NY (US)

(72) Inventors: Robert Gregory Wagoner, Roanoke, VA (US); Govardhan Ganireddy, Bangalore (IN); Saurabh Shukla, Clifton Park, NY (US); Ravisekhar Nadimpalli Raju, Clifton Park, NY (US); Harold Robert Schnetzka, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/399,824

(22) Filed: Jan. 6, 2017

(65) Prior Publication Data

US 2018/0198393 A1 Jul. 12, 2018

(51) Int. Cl.
*H02P 9/10* (2006.01)
*H02K 11/33* (2016.01)
(Continued)

(52) U.S. Cl.
CPC ............... *H02P 9/10* (2013.01); *F03D 7/042* (2013.01); *H02K 7/183* (2013.01); *H02K 11/33* (2016.01);
(Continued)

(58) Field of Classification Search
CPC . H02H 3/20; H02H 7/06; H02H 7/122; H02P 9/00; H02P 9/006; H02P 9/007;
(Continued)

(56) References Cited

U.S. PATENT DOCUMENTS

| 4,677,535 A | * | 6/1987 | Kawabata | ............. | H02M 7/493 307/58 |
| 5,638,263 A | | 6/1997 | Opal et al. | | |

(Continued)

FOREIGN PATENT DOCUMENTS

JP 2009-201195 9/2009

OTHER PUBLICATIONS

PCT International Search Report and Written Opinion for corresponding PCT Application No. PCT/US2017/067633, dated Apr. 17, 2018, 13 pages.

*Primary Examiner* — Gary L Laxton
(74) *Attorney, Agent, or Firm* — Dority & Manning, P.A.

(57) ABSTRACT

Systems and methods for protecting the redundancy of inverter blocks are provided. In one example implementation, a system can include a plurality of inverter blocks. Each inverter block can include a first conversion entity configured to convert DC power to AC power, a second conversion entity configured to convert AC power to DC power, and a third conversion entity configured to convert DC power to AC power. An isolation transformer can be coupled between the first conversion entity and the second conversion entity. The system includes an inverter block switching element coupled to an output of each inverter block. A protection element is disposed in each inverter block. The system includes one or more control devices configured to isolate at least one of the plurality of inverter blocks based at least in part on a status of the protection element disposed in the inverter block.

20 Claims, 8 Drawing Sheets

(51) Int. Cl.
- *F03D 7/04* (2006.01)
- *H02K 7/18* (2006.01)
- *H02P 9/00* (2006.01)
- *H02M 7/48* (2007.01)
- *H02M 1/00* (2006.01)
- *H02M 1/32* (2007.01)

(52) U.S. Cl.
CPC .......... *H02M 7/4807* (2013.01); *H02P 9/007* (2013.01); *H02M 2001/0077* (2013.01); *H02M 2001/325* (2013.01)

(58) Field of Classification Search
CPC  H02P 9/10; H02P 9/107; H02K 11/20; H02K 11/26; H02K 11/27; H02K 7/18; F03D 7/04
See application file for complete search history.

(56) References Cited

U.S. PATENT DOCUMENTS

| | | |
|---|---|---|
| 5,986,909 A | 11/1999 | Hammond et al. |
| 6,222,284 B1 | 4/2001 | Hammond et al. |
| 7,079,406 B2 * | 7/2006 | Kurokami ............ H02J 7/0052 323/906 |
| 7,568,931 B2 | 8/2009 | Hammond |
| 7,800,254 B2 | 9/2010 | Hammond |
| 8,008,923 B2 | 8/2011 | Hammond |
| 8,093,764 B2 | 1/2012 | Hammond |
| 8,207,812 B2 | 6/2012 | Roc et al. |
| 8,441,147 B2 | 5/2013 | Hammond |
| 8,570,003 B2 * | 10/2013 | Lu ............................ H02P 9/10 318/268 |
| 8,988,860 B2 | 3/2015 | Hammond |
| 9,277,683 B2 | 3/2016 | Ionescu et al. |
| 2006/0227579 A1 * | 10/2006 | Glauser .................. H02J 9/062 363/71 |
| 2009/0273738 A1 | 11/2009 | Fukumoto |
| 2010/0244775 A1 | 9/2010 | Smith |
| 2011/0199707 A1 | 8/2011 | Kazemi et al. |
| 2012/0026764 A1 * | 2/2012 | Giuntini .................. H02J 9/005 363/69 |
| 2014/0078797 A1 * | 3/2014 | Mihalache ............. H02M 7/49 363/71 |
| 2014/0339890 A1 | 11/2014 | Wolff et al. |
| 2015/0070939 A1 | 3/2015 | Gupta et al. |

* cited by examiner

PROTECTION FOR REDUNDANCY OF ISOLATED INVERTER BLOCKS

FIELD

The present subject matter relates generally to power systems, and more particularly to power systems having power converters utilizing silicon carbide MOSFETs.

BACKGROUND

Power generation systems can use power converters to convert power into a form of power suitable for an energy grid. In a typical power converter, a plurality of switching devices, such as insulated-gate bipolar transistors ("IGBTs") or metal-oxide-semiconductor field effect transistors ("MOSFETs") can be used in electronic circuits, such as half bridge or full-bridge circuits, to convert the power. Recent developments in switching device technology have allowed for the use of silicon carbide ("SiC") MOSFETs in power converters. Using SiC MOSFETs allows for operation of a power converter at a much higher switching frequency compared to conventional IGBTs.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a power converter system. The system can include a plurality of inverter blocks. Each inverter block can include a plurality of conversion entities. Each conversion entity has a plurality of bridge circuits. Each bridge circuit includes a plurality of semiconductor switching elements coupled in series. The plurality of conversion entities include a first conversion entity configured to convert DC power to AC power, a second conversion entity configured to convert AC power to DC power, and a third conversion entity configured to convert DC power to AC power. An isolation transformer can be coupled between the first conversion entity and the second conversion entity. The system includes an inverter block switching element coupled to an output of each inverter block. At least one protection element is disposed in each inverter block. The system includes one or more control devices configured to isolate at least one of the plurality of inverter blocks based at least in part on a status of the at least one protection element disposed in the inverter block.

Another example aspect of the present disclosure is directed to a method for isolating an inverter block in a power converter system. The power converter system includes a plurality of inverter blocks. Each inverter block includes a plurality of conversion entities. Each conversion entity has a plurality of bridge circuits. Each bridge circuit includes a plurality of silicon carbide MOSFET switching elements coupled in series. The plurality of conversion entities include a first conversion entity configured to convert DC power to AC power, a second conversion entity configured to convert AC power to DC power, and a third conversion entity configured to convert DC power to AC power. An isolation transformer can be coupled between the first conversion entity and the second conversion entity. The method includes: obtaining, by one or more control devices, a signal from a one or more sensors associated with a protection element disposed in the inverter block; determining, by the one or more control devices, a status of the protection element based at least in part on the signal from the one or more sensors; and controlling an inverter block switching element to isolate one of the plurality of inverter blocks based at least in part on the status of the protection element.

Yet another example aspect of the present disclosure is directed to a wind driven generator system. The system includes a wind driven generator. The system includes a power converter. The power converter includes a plurality of inverter blocks. Each inverter block includes a plurality of conversion entities. Each conversion entity has a plurality of bridge circuits. Each bridge circuit includes a plurality of silicon carbide MOSFET switching elements coupled in series. The plurality of conversion entities include a first conversion entity configured to convert DC power to AC power, a second conversion entity configured to convert AC power to DC power, and a third conversion entity configured to convert DC power to AC power. An isolation transformer can be coupled between the first conversion entity and the second conversion entity. The system includes one or more control devices configured to isolate at least one of the plurality of invelier blocks based at least in part on a status of the at least one fuse disposed in the inverter block.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for protecting redundancy of isolated power converters. For example, power generation systems, such as systems using doubly fed induction generators ("DFIGs") or other power generation systems, can use one or more power converters to convert power into multiphase alternating current power suitable for a power grid. In some configurations, a power generation system can include a plurality of power converters, such as a first AC to DC converter and a second DC to DC to AC converter that includes an isolation transformer. The AC to DC and DC to DC to AC converters can convert the power from the power generator, such as a DFIG, from a low voltage to a medium voltage suitable for an electrical grid. This configuration can allow for the elimination of a three winding transformer at the grid interconnection, thereby reducing the cost of the power system.

In some implementations, the DC to DC to AC converter can include a plurality of redundant inverter blocks. Each of the inverter blocks can include, for instance, silicon carbide MOSFETS as power switching elements to provide a high switching frequency DC to DC converter with an isolation transformer. These inverter blocks can be combined together to create a low voltage DC to medium voltage AC converter. It can be desirable for continued operation of the power converter when one or more of the redundant inverter blocks have failed.

Example aspects of the present disclosure are directed systems and methods for allowing individual inverter blocks to be isolated in the power converter when the individual inverter block fails. In some embodiments, an inverter block can include at least one protection element (e.g., a fuse) disposed in the inverter block. Each inverter block can further include an inverter block switching element coupled to an output of each inverter block. One or more control devices can receive signals from various sensors (e.g., voltage sensors and/or current sensors) and can process the signals to determine a status of the at least one protection element. When the at least one protection element is open (e.g., the fuse has blown), the one or more control devices can control the inverter block switching element to isolate the inverter block from the remaining inverter blocks in the power converter. In this way, systems and methods according to example embodiments of the present disclosure can have a technical effect of allowing for continued operation of the power converter when one or more of the redundant inverter blocks have failed. In addition, damage to a failed inverter block can be limited.

Figure 1:
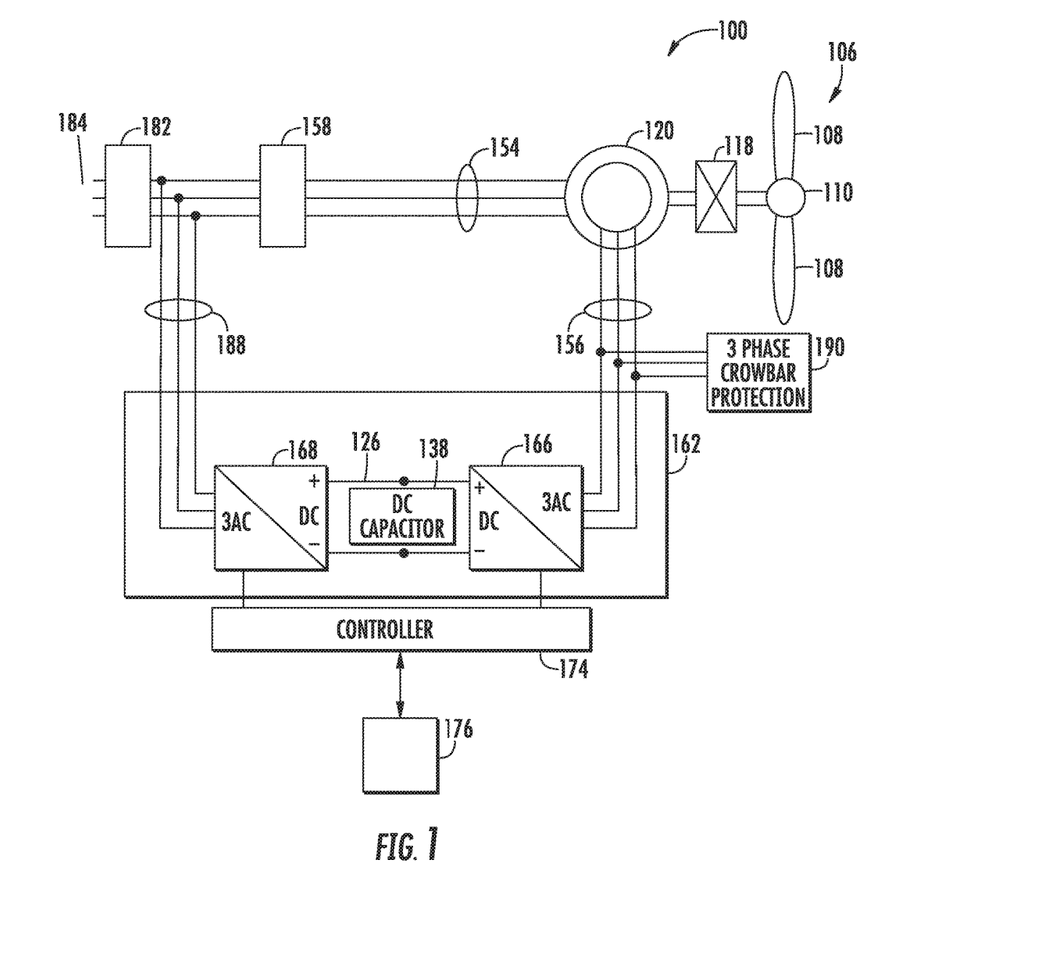
FIG. 1 depicts an example power generation system according to example embodiments of the present disclosure.

With reference now to the figures, example aspects of the present disclosure will be discussed in greater detail. FIG. 1 depicts a power generation system 100 according to example aspects of the present disclosure, which includes a double-fed induction generator (DFIG) 120. The present disclosure will be discussed with reference to the example power generation system 100 of FIG. 1 for purposes of illustration and discussion. Those of ordinary skill in the art, using the disclosures provided herein, should understand that aspects of the present disclosure are also applicable in other systems, such as full power conversion wind turbine systems, solar power systems, energy storage systems, and other power systems.

In the example power generation system 100, a rotor 106 includes a plurality of rotor blades 108 coupled to a rotating hub 110, and together define a rotational component. The rotational component is coupled to an optional gear box 118, which is, in turn, coupled to a generator 120. In accordance with aspects of the present disclosure, the generator 120 is a doubly fed induction generator (DFIG) 120.

DFIG 120 is typically coupled to a stator bus 154 and a power converter 162 via a rotor bus 156. The stator bus provides an output multiphase power (e.g. three-phase power) from a stator of DFIG 120 and the rotor bus 156 provides an output multiphase power (e.g. three-phase power) of DFIG 120. The power converter 162 can be a bidirectional power converter configured to provide output power to the electrical grid 184 and/or to receive power from the electrical grid 184. As shown, DFIG 120 is coupled via the rotor bus 156 to a rotor side converter 166. The rotor side converter 166 is coupled to a line side converter 168 which in turn is coupled to a line side bus 188. An auxiliary power feed (not shown) can be coupled to the line side bus 188 to provide power for components used in the wind turbine system, such as fans, pumps, motors, and other components of the wind turbine system.

In example configurations, the rotor side converter 166 and/or the line side converter 168 are configured for normal operating mode in a three-phase, pulse width modulation (PWM) arrangement using SiC MOSFETs and/or IGBts as switching devices. SiC MOSFETs can switch at a very high frequency as compared to conventional IGBTs or MOSFETs. For example, SiC MOSFETs can be switched at a frequency from approximately 0.01 Hz to 10 MHz, with at typical switching frequency of 1 KHz to 400 KHz, whereas IGBTs can be switched at a frequency from approximately 0.01 Hz to 200 KHz. Additionally, SiC MOSFETs can provide advantages over ordinary MOSFETs when operating in some voltage ranges. For example, in power converters operating at 1200V-1700V on the LV side, SiC MOSFETs have lower switching and/or conduction losses than ordinary MOSFETs. In some implementations, the rotor side converter 166 and/or the line side converter 168 can include a plurality of conversion modules, each associated with a an output phase of the multiphase power, as will be discussed in more detail with respect to FIGS. 2 and 3. The rotor side converter 166 and the line side converter 168 can be coupled via a DC link 126 across which can be a DC link capacitor 138. In some embodiments, the DC link 126 can include a dynamic brake (not shown). The dynamic brake can include a switching element (e.g., an IGBT) coupled in series with a dissipative element (e.g., a resistor). The switching element can be controlled using pulse width modulation techniques via one or more control devices (e.g., controller 174 or control system 176) to control the voltage on the DC link 126.

The power converter 162 can be coupled to a controller 174 to control the operation of the rotor side converter 166 and the line side converter 168. It should be noted that the controller 174, in typical embodiments, is configured as an interface between the power converter 162 and a control system 176.

In operation, power generated at DFIG 120 by rotating the rotor 106 is provided via a dual path to electrical grid 184. The dual paths are defined by the stator bus 154 and the rotor bus 156. On the stator bus side 154, sinusoidal multiphase (e.g. three-phase) is provided to the electrical grid. In particular, the AC power provided via the stator bus 154 can be a medium voltage ("MV") AC power. As used herein, MV AC power can be an alternating current power greater than about 1.0 kilovolts and less than about 100 kilovolts, such as greater than about 1.5 kilovolts and less than about 100 kilovolts. As used herein, the term "about" can mean within 20% of the stated value. On the rotor bus side 156, sinusoidal multiphase (e.g. three-phase) AC power is provided to the power converter 162. In particular, the AC power provided to the power converter 162 via the rotor bus 156 can be a low voltage ("LV") AC power. As used herein, LV AC power can be an alternating current power less than or equal to 1.5 kilovolts, such as less than about 1.0 kilovolts. The rotor side power converter 166 converts the LV AC power provided from the rotor bus 156 into DC power and provides the DC power to the DC link 126 or vice versa. Switching devices (e.g. SiC MOSFETs and/or IGBTs) used in parallel bridge circuits of the rotor side power converter 166 can be modulated to convert the AC power provided from the rotor bus 156 into DC power suitable for the DC link 126. Such DC power can be a LV DC power.

In a power generation system 100, the power converter 162 can be configured to convert the LV power to MV AC power (through the use of an isolation transformer). For example, the line side converter 168 converts the LV DC power on the DC link 126 into a MV AC power suitable for the electrical grid 184. In particular, SiC MOSFETs used in bridge circuits of the line side power converter 168 can be modulated to convert the DC power on the DC link 126 into AC power on the line side bus 188. SiC MOSFETs can be operated at a higher switching frequency than conventional IGBTs. In addition, one or more isolation transformers coupled to one or more of the bridge circuits can be configured to step the voltage from the DC link up or down as needed. Additionally, a plurality of inverter blocks can be connected in series on the MV side to collectively step up the voltage of the power on the DC link 126 to a MV AC power. The MV AC power from the power converter 162 can be combined with the MV power from the stator of DFIG 120 to provide multiphase power (e.g. three-phase power) having a frequency maintained substantially at the frequency of the electrical grid 184 (e.g. 50 Hz/60 Hz). In this manner, the MV line side bus 188 can be coupled to the MV stator bus 154 to provide such multiphase power.

Various circuit breakers and switches, such as grid breaker 182, stator sync switch 158, etc. can be included in the power generation system 100 for isolating the various components as necessary for normal operation of DFIG 120 during connection to and disconnection from the electrical grid 184. In this manner, such components can be configured to connect or disconnect corresponding buses, for example, when current flow is excessive and can damage components of the power generation system 100 or for other operational considerations. Additional protection components can also be included in the power generation system 100. For example, as depicted in FIG. 1, a multiphase crowbar circuit 190 can be included to protect against an overvoltage condition damaging circuits of the power generation system 100.

The power converter 162 can receive control signals from, for instance, the control system 176 via the controller 174. The control signals can be based, among other things, on sensed conditions or operating characteristics of the power generation system 100. Typically, the control signals provide for control of the operation of the power converter 162. For example, feedback in the form of sensed speed of the DFIG 120 can be used to control the conversion of the output power from the rotor bus 156 to maintain a proper and balanced multiphase (e.g. three-phase) power supply. Other feedback from other sensors can also be used by the controller 174 to control the power converter 162, including, for example, stator and rotor bus voltages and current feedbacks. Using the various forms of feedback information, switching control signals (e.g. gate timing commands for switching devices), stator synchronizing control signals, and circuit breaker signals can be generated.

Figure 2:
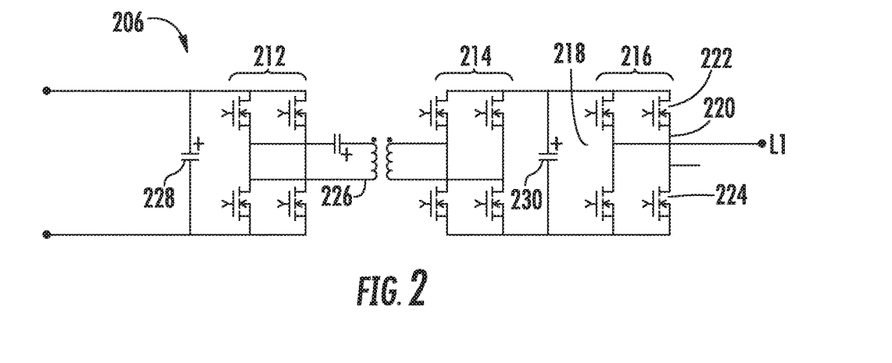
FIG. 2 depicts an example topology of an example inverter block according to example aspects of the present disclosure.
Figure 4:
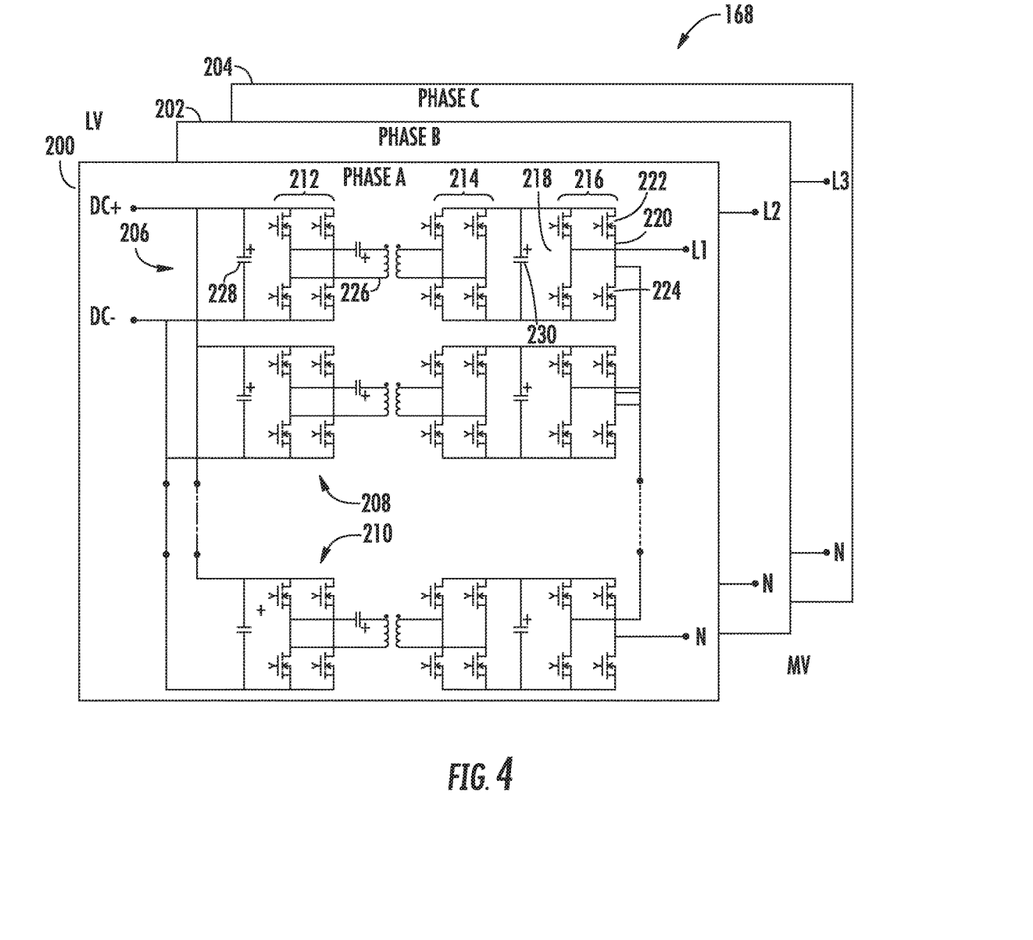
FIG. 4 depicts a multiphase power converter including a plurality of inverter blocks for multiple phases according to example embodiments of the present disclosure.

Referring now to FIG. 2, a topology of a component in a DC to DC to AC converter is depicted. FIG. 2 depicts an example DC to DC to AC building block 206, which can be included in a conversion module 200 of a line side converter 168, as depicted in FIG. 4. Each building block 206 can include a plurality of conversion entities. For instance, building block 206 can include first conversion entity 212, second conversion entity 214, and third conversion entity 216. Each conversion entity 212-216 can include a plurality of bridge circuits. For instance, conversion entity 216 includes bridge circuit 218 and bridge circuit 220. As indicated, each bridge circuit can include a plurality of semiconductor switching devices coupled in series. For instance, bridge circuit 220 includes an upper switching device 222 and a lower switching device 224. The switching devices can be SiC MOSFETs. In some embodiments, the switching devices can be IGBTs. As shown, building block 206 further includes an isolation transformer 226. The isolation transformer 226 can be coupled between first conversion entity 212 and second conversion entity 214. As shown, the inverter block 206 can further include capacitors 228 and 230.

First conversion entity 212, isolation transformer 226 and second conversion entity 214 can together define an inner converter 240. Inner converter 240 can be operated to convert a LV DC power from the DC link 126 to a MV DC power. In an embodiment, inner converter 240 can be a high-frequency resonant converter. In a resonant converter configuration, a resonant capacitor 232 can be included on a LV side of the isolation transformer 226 as depicted in DIG. 2, on an MV side of the isolation transformer 226 (not depicted), or on both the LV and MV sides of the isolation transformer 226. In another embodiment, inner converter 240 can be a hard switched converter by removing the resonant capacitor 232. Third conversion entity 216 can also be referred to as an outer converter 216. Outer converter 216 can convert a LV DC power from the inner converter to a LV AC power suitable for use on an energy grid 184. A plurality of inverter blocks can be connected in series to build a MV AC voltage suitable for use on a MV AC energy grid. In a typical application, outer converter 216 can be a hard-switched converter, and therefore not include a resonant capacitor.

Figure 3:
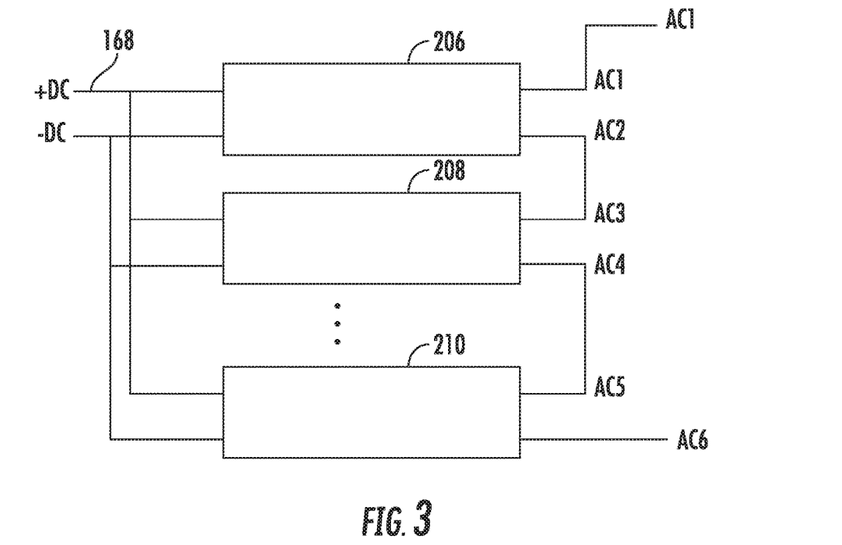
FIG. 3 depicts a plurality of inverter blocks coupled together for form a power converter of a phase of a multi-phase power converter according to example embodiments of the present disclosure.

Referring to FIG. 3, a plurality of inverter blocks 206, 208, 210 can be coupled together to provide redundancy of power conversion and for other purposes. Three inverter blocks 206, 208, and 210 are depicted in FIG. 3 for purposes of illustration and discussion. Those of ordinary skill in the art, using the disclosures provided herein, will understand that any number of inverter blocks can be coupled together without deviating from the scope of the present disclosure. Each of the inverter blocks 206, 208, and 210 can have the topology of the DC to DC to AC inverter block 206 depicted in FIG. 2.

As shown in FIG. 3, the plurality of inverter blocks 206, 208, and 210 can be coupled in parallel to a DC bus (e.g., DC link 168 of FIG. 1). The AC outputs of the inverter blocks can be coupled together in series as shown in FIG. 3 to provide an overall AC output between nodes AC 1 and AC 6. For instance, inverter block 206 can have AC outputs AC 1 and AC 2. Inverter block 206 can have AC outputs AC 3 and AC 4. Inverter block 210 can have AC output AC 5 and AC 6. As will be discussed in detail below, inverter block switching elements for isolation of the inverter blocks can be coupled to the AC outputs of each inverter block (e.g., between outputs. As shown in FIG. 3, output AC 2 can be coupled to output AC 3. Output AC 4 can be coupled to output AC 5.

FIG. 4 depicts an example line side converter 168 according to example embodiments of the present disclosure. As shown, the line side converter 168 includes conversion module 200, conversion module 202, and conversion module 204. The conversion modules 200-204 can be configured to receive a LV DC power from the rotor side converter 166, and to convert the LV DC power to a MV AC power for feeding to the electrical grid 184. Each conversion module 200-204 is associated with a single phase of three-phase output AC power. In particular, conversion module 200 is associated with the phase A output of the three-phase output power, conversion module 202 is associated with the phase B output of the three-phase output power, and conversion module 204 is associated with the phase C output of the three-phase output power.

Each conversion module 200-204 includes a plurality of inverter blocks 206-210 coupled together as illustrated in FIG. 3. For instance, as shown, conversion module 200 includes building blocks 206, building block 208, and building block 210. The line side converter 168 can be a bidirectional power converter. The line side converter 168 can be configured to convert a LV DC power to a MV AC power and vice versa. For instance, when providing power to the electrical grid 184, the line side converter 168 can be configured to receive a LV DC power from the DC link 126 on a LV side of the line side converter 168, and to output a MV AC power on a MV side of the line side converter 168. The inverter blocks 206-210 can be coupled together in parallel on the LV side and can be coupled together in series on the MV side.

In one particular example implementation, when providing power to the electrical grid 184, the conversion entity 212 can be configured to convert the LV DC on the DC link 126 to a LV AC power. The isolation transformer 226 can be configured to provide isolation. The conversion entity 214 can be configured to convert the LV AC power to a LV DC power. The conversion entity 216 can be configured to convert the LV DC power to a LV AC power suitable for provision to the electric grid 184. A plurality of inverter blocks can be connected in series to build a MV AC voltage suitable for use on a MV AC energy grid.

The building blocks 206-210 can be configured to contribute to the overall MV AC power provided by the conversion module 200. In this manner, any suitable number of building blocks can be included within the building blocks 206-210. As indicated, each conversion module 200-204 is associated with a single phase of output power. In this manner, the switching devices of the conversion modules 200-204 can be controlled using suitable gate timing commands (e.g. provided by one or more suitable driver circuits) to generate the appropriate phase of output power to be provided to the electrical grid. For example, the controller 174 can provide suitable gate timing commands to the gates of the switching devices of the bridge circuits. The gate timing commands can control the pulse width modulation of the SiC MOSFETs and/or IGBTs to provide a desired output.

It will be appreciated, that although FIG. 4 depicts only the line side converter 168, the rotor side converter 166 depicted in FIG. 1 can include the same or similar topology. In particular, the rotor side converter 166 can include a plurality of conversion modules having one or more module branches as described with reference to the line side converter 168. Further, it will be appreciated that the line side converter 168 and the rotor side converter 166 can include SiC MOSFETs, IGBT switching devices, and/or other suitable switching devices. In implementations wherein the rotor side converter 166 is implemented using SiC MOSFETs, the rotor side converter 166 can be coupled to a crowbar circuit (e.g. multiphase crowbar circuit 190) to protect the SiC MOSFETs from high rotor current during certain fault conditions.

Figure 5:
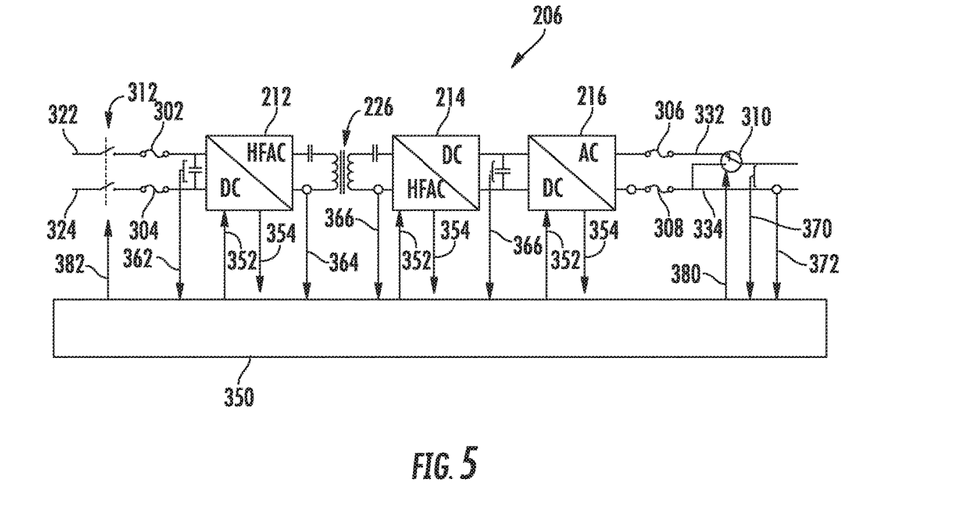
FIG. 5 depicts an example inverter block according to example embodiments of the present disclosure.
Figure 6:
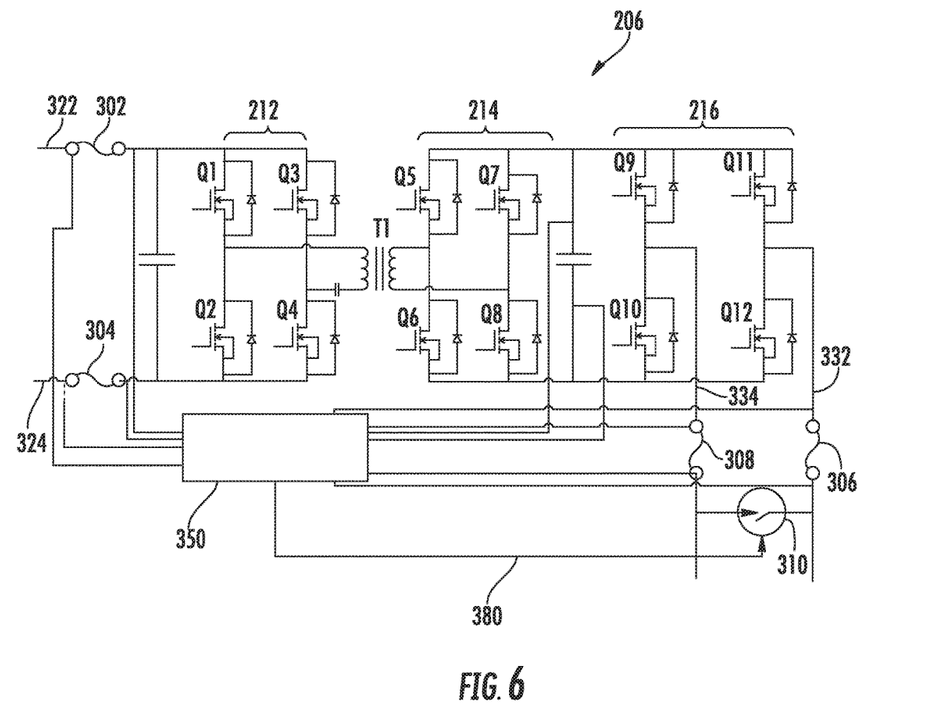
FIG. 6 depicts a circuit diagram of an example inverter block according to example embodiments of the present disclosure.

FIG. 5-6 depicts an example inverter block 206 including a protection scheme for isolation of the inverter block according to example embodiments of the present disclosure. More particularly, FIG. 5 depicts a block diagram of an example inverter block 206 while FIG. 6 depicts an example circuit diagram of an inverter block 206 according to example embodiments of the present disclosure.

As discussed above, the inverter block 206 can include a first conversion entity 212 configured to convert DC power to AC power, a second conversion entity 214 configured to convert AC power to DC power, and a third conversion entity 216 configured to convert DC power to AC power. An isolation transformer 226 can be coupled between the first conversion entity 212 and the second conversion entity 214.

As shown in FIG. 6, first conversion entity 212 can include bridge circuits with silicon carbide MOSFET switching elements Q1, Q2, Q3, and Q4. Second conversion entity 214 can include bridge circuits with silicon carbide MOSFET switching elements Q5, Q6, Q7, and Q8. Third conversion entity 216 can include bridge circuits with silicon carbide MOSFETS Q9, Q10, Q11, and Q12. In some embodiments, the switching elements Q1, Q2, Q3, Q4, Q5, Q6, Q7, Q8, Q9, Q10, Q11 and/or Q12 can be other power semiconductor switching elements, such as IGBTs.

The inverter block 206 includes at least one protection element. A protection element can be any device configured to protect inverter block 206 from surge conditions, overvoltage conditions, or other abnormal conditions, such as a fuse, or other protection element (e.g., metal oxide varistor (MOV), Zener diode, etc.). A purpose of a fuse is to open the inverter block 206 if the inverter block fails open. Other protections devices (e.g., MOV, Zener diode, etc. can serve to limit the peak voltage). In the embodiments of FIGS. 5 and 6, the inverter block 206 includes at least a first fuse 302. The first fuse 302 can be coupled in series with a first DC bus input 322. A second fuse 304 can be coupled in series with a second DC bus input 324. Optionally, the inverter block 206 can include a third fuse 306 coupled in series with a first AC output 332 and a fourth fuse 308 coupled in series with a second AC output 334.

The inverter block 206 can further include an inverter block switch 310 coupled to the AC output 334 of the inverter block 310. The inverter block switch 310 can have an open position where the inverter block 206 provides power conversion as part of a power converter. The inverter block switch 310 can have a closed position which can isolate the inverter block 206 from the remaining inverter blocks in the power converter. When the inverter block switch 310 is in the closed position, other inverter blocks located downstream on the AC side of the power converter can still provide AC power in the power system.

In some embodiments, the inverter block switch 310 can be a relay (e.g., a latching style relay or a conventional normally open relay). Use of a latching relay in some embodiments can allow for loss of controls power without affecting protective operation. In some embodiments, the inverter block switch 310 can be a power semiconductor switching element (e.g., an IGBT, MOSFET) or other switching element.

The inverter block 206 can provide and receive signals to one or more control devices 350. Control device(s) 350 can be any suitable control device, such as a microcontroller, processor with one or more memory devices, one or more logic devices, one or more application specific integrated circuits, or other devices configured to execute the control methods discussed herein. The one or more control devices (s) 350 can include or can be a part of controller 174 and/or control system 176.

The control device(s) 350 can provide gate timing commands 352 to the various conversion entities 212, 214, and 216 based on feedback signals 354 received from the conversion entities 212, 214, and 216. The control device(s) 350 can also receive signals associated with the various protection elements (e.g., fuses 302, 304, 306, and 308) and process the signals to determine a status of the protection elements. For instance, the control device(s) 350 can receive signals indicative of a voltage across one or more of the fuses 302, 304, 306, and/or 308 and/or a current flowing in series with the one or more fuses 302, 304, 306, and/or 308. If a voltage across a fuse is about 0V or nominal voltage, then the fuse can be determined to be closed. If the voltage across a fuse is greater than 0V or nominal voltage, the fuse can be determined to be opened. If there is current flowing through the fuse, the fuse can be determined to be closed. In some embodiments, the fuse can include a fuse blown indicator which can be used as a signal (e.g., an electronic data signal) to determine a status of the fuse.

Other signals associated with the protection elements can be used to determine a status of the protection elements. For instance, one or more of signal 362 indicative of a voltage across an input DC capacitor, signal 364 indicative of a current in a primary winding of transformer 226 and signal (s) 366. Signal(s) 366 can be indicative of one or more of a current in a secondary winding of transformer 226, a voltage across DC capacitor, an output current, etc.

Referring still to FIG. 6, the control devices 350 can receive other signals, such as signals indicative of a state of the inverter block switching element 310. For instance, referring to FIG. 5, signal 370 indicative of a voltage and/or signal 372 indicative of a current can be used to determine a state of the inverter block switching element 310. Other signals can be received and/or processed without deviating from the scope of the present disclosure.

The control device(s) 350 can process the signals to determine a status of the one or more protection elements. If one or more of the protection elements (e.g., fuses 302, 304, 306, and 308) are determined to be opened, the control device(s) 350 can send a control signal 380 to close inverter block switch 310 to isolate the inverter block 206 from the power system. Otherwise the inverter block switch 310 can be maintained opened. In some embodiments, the control device(s) 350 can send a control signal 382 to open switch 312 when one or more of the protection elements are determined to be opened.

Figure 7:
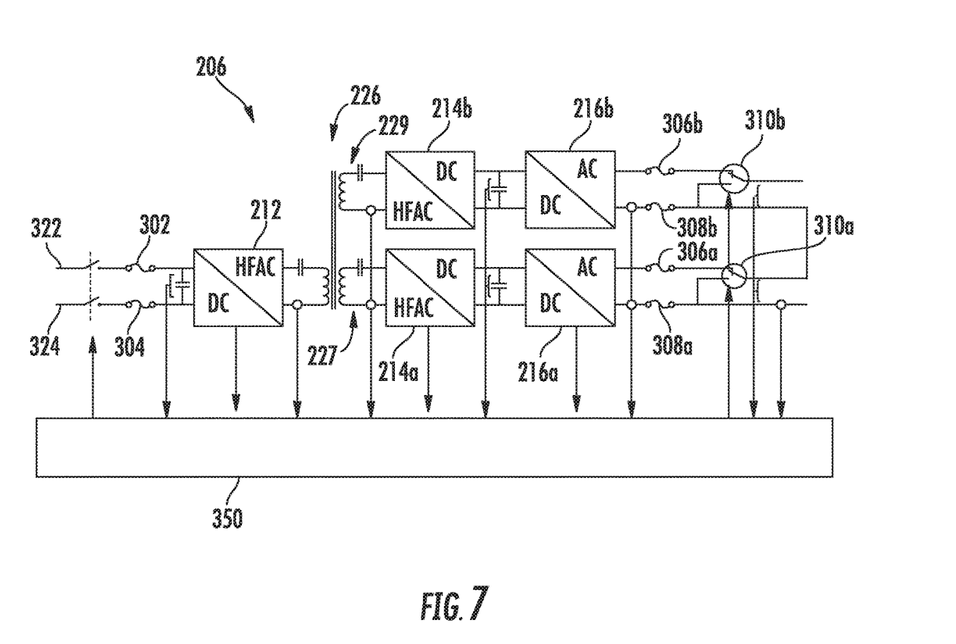
FIG. 7 depicts an example inverter block according to example embodiments of the present disclosure.

FIG. 7 depicts an inverter block 206 according to example embodiments of the present disclosure. The inverter block 206 of FIG. 7 is similar to the inverter block 206 of FIGS. 5 and 6 except that the isolation transformer 226 includes a plurality of secondary windings 227 and 229. Any number of secondary windings can be used without deviating from the scope of the present disclosure.

Each secondary winding can be coupled to its own AC to DC conversion entity and DC to AC conversion entity. For instance, as shown in FIG. 7, second conversion entity 214a and third conversion entity 216a are coupled to a first secondary winding 227. Second conversion entity 214b and third conversion entity 216b are coupled to a second secondary winding 229.

Similar to the inverter block of FIGS. 5 and 6, the inverter block 206 can include protection elements (e.g., fuses). For instance, as shown in FIG. 7, a first fuse 302 can be coupled in series with a first DC bus input 322. A second fuse 304 can be coupled in series with a second DC bus input 324. Optionally, the inverter block 206 can include a third fuse 306a coupled in series with a first AC output associated with the third conversion entity 216a and a fourth fuse 308a coupled in series with a second AC output associated with the third conversion entity 216a. In addition, the inverter block 206 can include a fifth fuse 306b coupled in series with a first AC output associated with the third conversion entity 216b and a fourth fuse 308b coupled in series with a second AC output associated with the third conversion entity 216b.

The inverter block 206 of FIG. 7 can include a plurality of inverter block switching elements. More particularly, the inverter block 206 includes a first inverter block switching element 310a coupled to the AC output of third conversion block 216a. The inverter block 206 includes a second inverter block switching element 310b coupled to the AC output of the third conversion block 216b.

The control device(s) 350 can be configured to control one or more of the first inverter block switching element 310a and the second inverter block switching element 310b to isolate the inverter block 206 (or at least a portion of the inverter block 206) from the power system. For instance, if one of fuses 302 or 304 are determined by the control device(s) 350 to be open, the control device(s) 350 can close both inverter block switching element 310a and inverter block switching element 310b to isolate the inverter block 206 from the power system. If one of fuses 306a and 308a are determined by the control device(s) 350 to be open, the control device(s) 350 can close inverter block switching element 310a. In some embodiments, inverter block switching element 310b can be maintained open. If one of fuses 306b and 308b are determined by the control device(s) 350 to be open, the control device(s) 350 can close inverter block switching element 310b. In some embodiments, inverter block switching element 310 can be maintained open.

Figure 8:
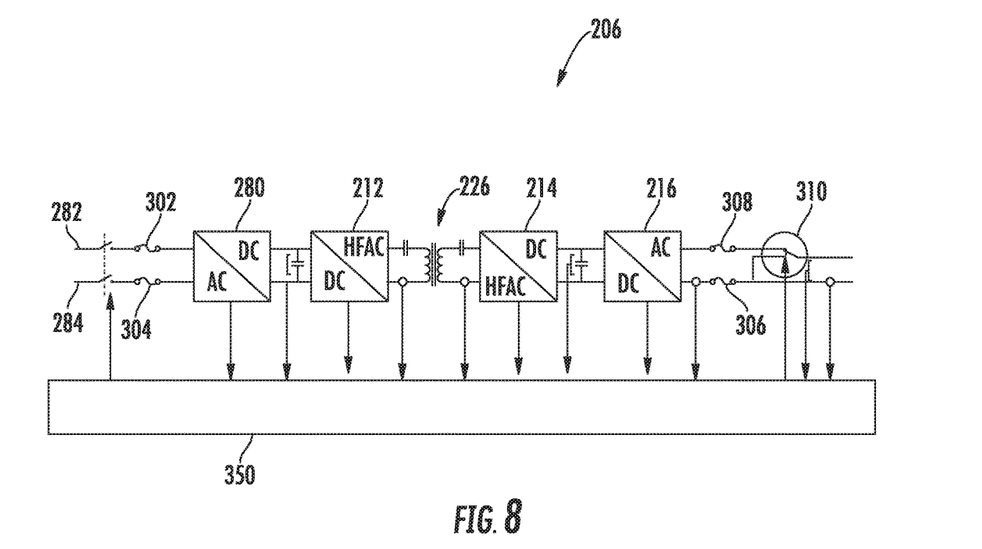
FIG. 8 depicts an example inverter block according to example embodiments of the present disclosure.
Figure 9:
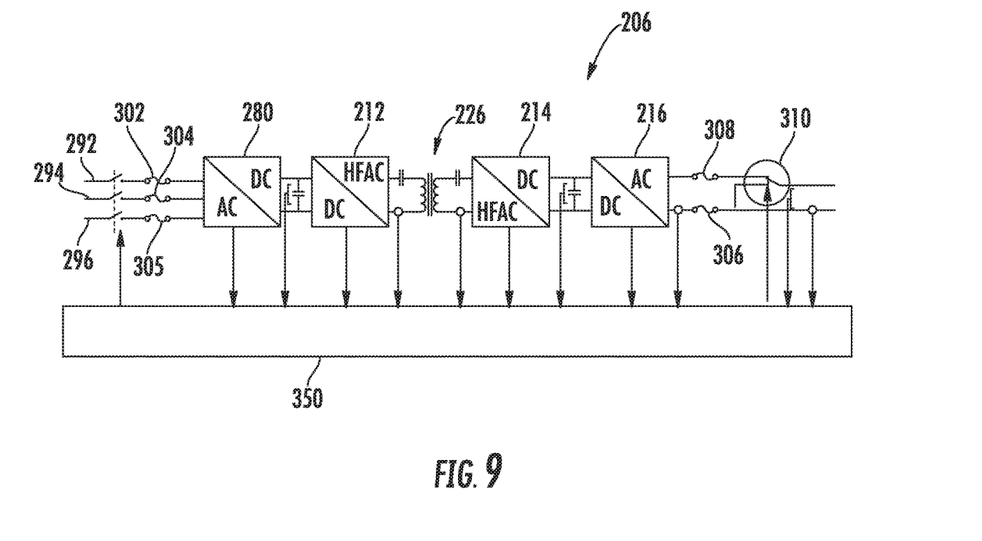
FIG. 9 depicts an example inverter block according to example embodiments of the present disclosure.

FIGS. 8 and 9 depict example inverter blocks 206 according to example embodiments of the present disclosure. The inverter blocks 206 of FIGS. 8 and 9 are similar to the inverter block 206 of FIGS. 5-6, except that the inverter blocks each have an input conversion entity 280 configured to convert AC power to DC power. The DC power is then converted to AC power through a first conversion entity 212, isolation transformer 226, second conversion entity 214, and third conversion entity 216 as discussed above.

The inverter blocks 206 of FIGS. 8 and 9 includes various protection elements, including fuse 306 and 308 coupled to the AC outputs of the inverter blocks. However, because the inverter blocks 206 of FIGS. 8 and 9 are configured to receive an AC input power, the input protection elements are disposed in AC inputs to the inverter blocks as opposed to DC inputs as illustrated in FIGS. 5 and 6. More particularly, the inverter block 206 of FIG. 8 includes a first fuse 302 coupled to a first AC input 282 and a second fuse 304 coupled to a second AC input 284. The inverter block 206 of FIG. 9 includes a first fuse 302 coupled to an A-phase input 292 of a three-phase AC input to the inverter block 206, a second fuse 304 coupled to a B-phase input 294 of a three-phase AC input to the inverter block 206, and a third fuse 305 coupled to a C-phase input 296 of a three-phase AC input to the inverter block 206.

The control device(s) 350 of FIGS. 8 and 9 can be configured to isolate the inverter blocks based at least in part on the status of the protection elements as disclosed herein. For example, the control device(s) 350 can control the inverter block switching element 310 of the inverter block 206 of FIG. 8 when one or more of fuse 302, 304, 306, and/or 308 are determined to be open. The control device(s) 350 can control the inverter block switching element 310 of the inverter block 206 of FIG. 9 when one or more of fuse 302, 304, 305, 306, and/or 308 are determined to be open.

Figure 10:
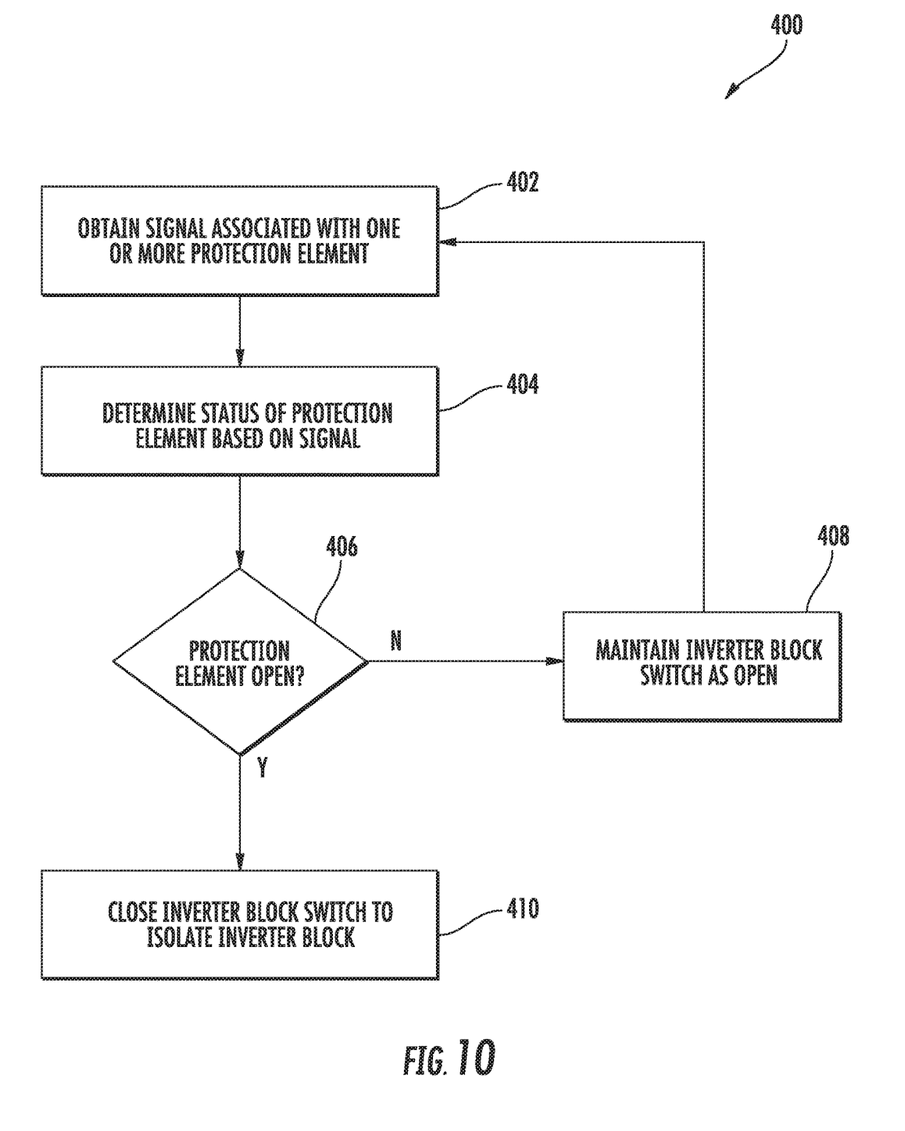
FIG. 10 depicts a flow diagram of an example method according to example embodiments of the present disclosure.

FIG. 10 depicts a flow diagram of an example method (400) of isolating an inverter block in a power converter system according to example embodiments of the present disclosure. The method (400) can be implemented by one or more control devices, such as one or more of the control devices of FIGS. 5-9. In addition, FIG. 10 depicts steps performed in a particular order for purposes of illustration and discussion. Those of ordinary skill in the art, using the disclosures provided herein, will understand that various steps of any of the methods described herein can be adapted, expanded, rearranged, and/or omitted in various ways without deviating from the scope of the present disclosure.

At (402), the method includes obtaining a signal associated with one or more protection elements in an inverter block. For instance, as discussed above, the control device(s) 350 of the example embodiment of FIGS. 5 and 6 can receive signals indicative of a voltage across one or more of the fuses 302, 304, 306, and/or 308 and/or a current flowing in series with the one or more fuses 302, 304, 306, and/or 308.

Other signals associated with the protection elements can be used to determine a status of the protection elements. For instance, one or more of signal 362 indicative of a voltage across an input DC capacitor, signal 364 indicative of a current in a primary winding of transformer 226, signal 366 indicative of a current in a secondary winding of transformer 226, signal 366 indicative of voltage across DC capacitor, signal 366 indicative of an output current. In some embodiments, the fuse can include a fuse blown indicator which can be used as a signal (e.g., an electronic data signal) to determine a status of the fuse.

At (404) of FIG. 10, the method can include processing the signals to determine the status of a protection element based on the signal. For instance, one or more fuses disposed in the inverter block can be determined to be opened or closed. As one example, if a voltage across a fuse is about 0V or nominal voltage, then the fuse can be determined to be closed. If the voltage across a fuse is greater than 0V or nominal voltage, the fuse can be determined to be opened. If there is current flowing through the fuse, the fuse can be determined to be closed. If no current is flowing through the fuse, the fuse can be determined to be open.

At (406), it is determined whether the one or more of the protection elements are open. When no protection elements for the inverter block are determined to be open, the inverter block switch associated with the inverter block can be maintained as open as shown at (408). The method (400) can repeat until it is determined that one or more of the protection elements are open.

When it is determined that one or more of the protection elements are open, the method can include closing the inverter block switch associated with the inverter block to isolate the inverter block from the power system as shown at (410). For example, the control device(s) 350 of the example inverter block 206 shown in FIGS. 5 and 6 can send a control signal to close inverter block switch 310. In this way, the redundancy provided by coupling multiple inverter blocks in a power converter can be preserved when one of the multiple inverter block fails.

The present disclosure is discussed with reference to DFIG power generation systems including a power converter utilizing silicon carbide MOSFETs and an isolation transformer for purposes of illustration and discussion. Those of ordinary skill in the art, using the disclosures provided herein, will understand that other power generation systems and/or topologies can benefit from example aspects of the present disclosure. For instance, the grounding and protection schemes disclosed herein can be used in a wind, solar, gas turbine, or other suitable power generation system. Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A power converter system, the power converter, comprising:
 a plurality of inverter blocks, each inverter block comprising a plurality of conversion entities, each conversion entity having a plurality of bridge circuits, each bridge circuit comprising a plurality of semiconductor switching elements coupled in series, wherein the plurality of conversion entities comprise a first conversion entity configured to convert DC power to AC power, a second conversion entity configured to convert AC power to DC power, and a third conversion entity configured to convert DC power to AC power, wherein an isolation transformer is coupled between the first conversion entity and the second conversion entity;
 an inverter block switching element coupled to an output of each inverter block;
 at least one protection element disposed in each inverter block;

one or more control devices configured to isolate at least one of the plurality of inverter blocks based at least in part on a status of the at least one protection element disposed in the inverter block.

2. The power converter system of claim 1, wherein the one or more control devices are configured to isolate at least one of the plurality of inverter blocks by opening the inverter block switching element coupled to the output of the at least one inverter block.

3. The power converter system of claim 1, wherein each inverter block comprises a first protection element coupled in series with a first DC bus input to the inverter block and a second protection element coupled in series with a second DC bus input from the inverter block.

4. The power converter system of claim 3, wherein the one or more control devices are configured to isolate at least one of the plurality of inverter blocks using the inverter block switching element associated with the at least one inverter block based at least in part on a status of the first protection element or the status of the second protection element disposed in the inverter block.

5. The power converter system of claim 3, wherein each inverter block comprises a third protection element coupled in series with a first AC output of the inverter block and a fourth protection element coupled in series with a second AC output of the inverter block.

6. The power converter system of claim 5, wherein the one or more control devices are configured to isolate at least one of the plurality of inverter blocks using the inverter block switching element associated with the at least one inverter block based at least in part on a status of the first protection element, the status of the second protection element, the status of the third protection element, or the status of the fourth protection element disposed in the inverter block.

7. The power converter system of claim 1, wherein each the plurality of semiconductor switching elements in each bridge circuit comprises a silicon carbide MOSFET.

8. The power converter system of claim 1, wherein each the plurality of semiconductor switching elements in each bridge circuit comprises an insulated gate bipolar transistor.

9. The power converter system of claim 1, wherein the inverter block switch comprises a relay.

10. The power converter system of claim 1, wherein the inverter block switch comprises a power semiconductor switch.

11. The power converter system of claim 1, wherein the at least on protection element comprises a fuse.

12. The power converter system of claim 1, wherein the plurality of inverter blocks are part of a line converter of a two-stage power converter used in a wind driven doubly-fed induction generator system.

13. The power converter system of claim 1, wherein the isolation transformer comprises a plurality of secondary windings, wherein each inverter block comprises a pair of second conversion entities, each second conversion entity coupled to one of the plurality of secondary windings.

14. The power converter system of claim 1, wherein each inverter block further comprises an input conversion entity, the input conversion entity having a plurality of bridge circuits, each bridge circuit comprising a plurality of semiconductor switching elements coupled in series, the input conversion entity configured to convert AC power to DC power, wherein the at least one protection element is coupled in series with an AC input to the input conversion entity.

15. The power converter system of claim 1, wherein DC inputs to the plurality of inverter blocks are coupled in parallel.

16. A method for isolating an inverter block in a power converter system, the power converter system comprising a plurality of inverter blocks, each inverter block comprising a plurality of conversion entities, each conversion entity having a plurality of bridge circuits, each bridge circuit comprising a plurality of silicon carbide MOSFET switching elements coupled in series, wherein the plurality of conversion entities comprise a first conversion entity configured to convert DC power to AC power, a second conversion entity configured to convert AC power to DC power, and a third conversion entity configured to convert DC power to AC power, wherein an isolation transformer is coupled between the first conversion entity and the second conversion entity, the method comprising:
    obtaining, by one or more control devices, a signal from a one or more sensors associated with a protection element disposed in the inverter block;
    determining, by the one or more control devices, a status of the protection element based at least in part on the signal from the one or more sensors;
    controlling an inverter block switching element to isolate one of the plurality of inverter blocks based at least in part on the status of the protection element.

17. The method of claim 16, wherein when the status of the protection element is determined to be open, controlling an inverter block switching element comprises opening the inverter block switching element.

18. The method of claim 16, wherein the inverter block switching element is normally closed.

19. The method of claim 16, wherein DC inputs to the plurality of inversion blocks are coupled in parallel.

20. A wind driven generator system, the system comprising:
    a wind driven generator;
    a power converter comprising:
        a plurality of inverter blocks, each inverter block comprising a plurality of conversion entities, each conversion entity having a plurality of bridge circuits, each bridge circuit comprising a plurality of semiconductor switching elements coupled in series, wherein the plurality of conversion entities comprise a first conversion entity configured to convert DC power to AC power, a second conversion entity configured to convert AC power to DC power, and a third conversion entity configured to convert DC power to AC power, wherein an isolation transformer is coupled between the first conversion entity and the second conversion entity;
        an inverter block switching element coupled to an output of each inverter block;
        at least one fuse disposed in each inverter block;
    one or more control devices configured to isolate at least one of the plurality of inverter blocks using the inverter block switching element associated with the at least one inverter block based at least in part on a status of the at least one fuse disposed in the inverter block.

* * * * *

UNITED STATES PATENT AND TRADEMARK OFFICE
CERTIFICATE OF CORRECTION

| | | |
|---|---|---|
| PATENT NO. | : 10,103,665 B2 | Page 1 of 1 |
| APPLICATION NO. | : 15/399824 | |
| DATED | : October 16, 2018 | |
| INVENTOR(S) | : Robert Gregory Wagoner et al. | |

It is certified that error appears in the above-identified patent and that said Letters Patent is hereby corrected as shown below:

In the Specification

In Column 1 Line 3, following the title of the invention and preceding the FIELD section insert:
--STATEMENT REGARDING FEDERALLY SPONSORED RESEARCH OR DEVELOPMENT
This invention was made with Government support under Contract No. DE-EE0007252 awarded by the U.S. Department of Energy (DOE). The Government has certain rights in the invention.--

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*